(12) United States Patent
Li et al.

(10) Patent No.: US 11,683,656 B2
(45) Date of Patent: Jun. 20, 2023

(54) RECOMMENDATION OF REGION OF INTEREST

(71) Applicant: BEIJING BAIDU NETCOM SCIENCE AND TECHNOLOGY CO., LTD., Beijing (CN)

(72) Inventors: Yanyan Li, Beijing (CN); Xinjiang Lu, Beijing (CN); Jianguo Duan, Beijing (CN)

(73) Assignee: BELTING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/207,601

(22) Filed: Mar. 19, 2021

(65) Prior Publication Data
US 2021/0211832 A1 Jul. 8, 2021

(30) Foreign Application Priority Data
Sep. 25, 2020 (CN) .......................... 202011022147.2

(51) Int. Cl.
*H04W 4/021* (2018.01)
(52) U.S. Cl.
CPC .................. *H04W 4/021* (2013.01)
(58) Field of Classification Search
CPC ..... H04W 4/021; H04W 4/023; H04W 4/029; G06Q 30/0241; G06Q 30/0261; G06Q 30/0282; G06F 16/29; G06F 16/2458
USPC ........................... 455/456.1–456.6
See application file for complete search history.

(56) References Cited

U.S. PATENT DOCUMENTS

| 9,646,025 | B2 * | 5/2017 | Boyns .................. | H04W 4/029 |
| 9,703,804 | B2 * | 7/2017 | Hill ........................ | G06F 16/23 |
| 10,387,896 | B1 * | 8/2019 | Hershey ................ | G06V 20/52 |
| 10,572,846 | B2 * | 2/2020 | Carlson ................ | G06F 3/0482 |

(Continued)

FOREIGN PATENT DOCUMENTS

| CN | 105865478 A | 8/2016 |
| CN | 107169082 A | 9/2017 |

(Continued)

OTHER PUBLICATIONS

Zhang et al., Mining Interesting Locations and Travel Sequences from GPS Trajectories, Microsoft Research Asia, 10 pages (Year: 2009).*

Primary Examiner — Mong-Thuy T Tran
(74) Attorney, Agent, or Firm — Manriel Kapouytian Woods LLP; Wensheng Ma; Liang Huang

(57) ABSTRACT

A method, device, and medium for recommending a region of interest are provided. The method includes: acquiring access data, the access data including correlation information between any two regions in a region group, in which a correlation between any two regions in the region group is acquired based on a region pair formed by the any two regions in the region group where sample users are located and the number of access times corresponding to the region pair, and in which the region group is acquired based on division of map data, and the map data includes boundary information of an entity in a real world; determining a region where a first user is currently located; and recommending region information of the region of interest for the first user based on the access data and the region where the first user is currently located.

12 Claims, 3 Drawing Sheets

(56) References Cited

U.S. PATENT DOCUMENTS

| | | | |
|---|---|---|---|
| 10,719,861 B2* | 7/2020 | Bonner | G06Q 30/0261 |
| 11,269,931 B2* | 3/2022 | Hampton | G08G 1/20 |
| 2009/0104920 A1* | 4/2009 | Moon | G06Q 30/02 |
| | | | 455/456.3 |
| 2011/0099047 A1* | 4/2011 | Weiss | G06Q 30/0202 |
| | | | 705/7.34 |
| 2013/0252633 A1* | 9/2013 | Liang | H04W 52/0251 |
| | | | 455/456.1 |
| 2015/0262197 A1* | 9/2015 | Chao | G06Q 30/0201 |
| | | | 705/7.34 |
| 2015/0347478 A1* | 12/2015 | Tripathi | G06F 16/248 |
| | | | 707/743 |
| 2016/0027029 A1* | 1/2016 | Poole | G06Q 10/087 |
| | | | 705/7.34 |
| 2016/0048900 A1* | 2/2016 | Shuman | G06Q 30/0204 |
| | | | 705/7.33 |
| 2016/0360377 A1* | 12/2016 | Lovich | H04W 4/022 |
| 2017/0024756 A1* | 1/2017 | Hulth | G06Q 90/00 |
| 2017/0103089 A1* | 4/2017 | Boyns | H04W 4/185 |
| 2017/0286450 A1* | 10/2017 | Jones | G06F 16/907 |
| 2017/0300511 A1* | 10/2017 | Brewington | G06F 16/29 |
| 2019/0066027 A1* | 2/2019 | Azar | G06Q 30/016 |
| 2020/0160364 A1* | 5/2020 | Milton | H04W 4/029 |
| 2021/0235224 A1* | 7/2021 | MacDonald-Korth | H04W 4/029 |

FOREIGN PATENT DOCUMENTS

| | | |
|---|---|---|
| CN | 107315824 A | 11/2017 |
| CN | 109345947 A | 2/2019 |

\* cited by examiner

RECOMMENDATION OF REGION OF INTEREST

CROSS-REFERENCE TO RELATED APPLICATION

This application claims priority to and benefits of Chinese Patent Application No. 202011022147.2, filed on Sep. 25, 2020. For various purposes, the entire content of the aforementioned application is incorporated herein by reference.

TECHNICAL FIELD

The present disclosure relates to the field of artificial intelligence, and specifically relates to big data and intelligent transportation, which can be applied to cloud platform scenarios.

BACKGROUND

Region is a spatial concept, which is a form of geographical structure that occupies a certain space on the earth's surface and uses different materials or non-materials as objects. The relationship between regions is vital to the movement of people and city management, etc.

SUMMARY

According to an aspect of the present disclosure, a method for recommending a region of interest is provided. The method includes: acquiring access data, the access data including correlation information between any two regions in a region group, in which a correlation between any two regions in the region group is acquired based on a region pair formed by the any two regions in the region group where sample users are located and the number of access times corresponding to the region pair, and in which the region group is acquired based on division of map data, and the map data includes boundary information of an entity in a real world; determining a region where a first user is currently located; and recommending region information of the region of interest for the first user based on the access data and the region where the first user is currently located.

According to another aspect of the present disclosure, a computing device is provided. The computing device includes a processor and a memory storing a program, the program including instructions that, when executed by the processor, cause the processor to perform the method according to the present disclosure.

According to another aspect of the present disclosure, a computer-readable storage medium is provided. The computer-readable storage medium storing computer program instructions that, when executed by a processor, cause the processor to perform the method according to the present disclosure.

BRIEF DESCRIPTION OF THE DRAWINGS

The drawings, which exemplarily illustrate embodiments and constitute a part of the specification, together with the text description of the specification, serve to explain exemplary implementations of the embodiments. The illustrated embodiments are for illustrative purposes only and do not limit the scope of the claims. Throughout the drawings, the same reference signs denote similar but not necessarily the same elements.

DETAILED DESCRIPTION

Figure 1:
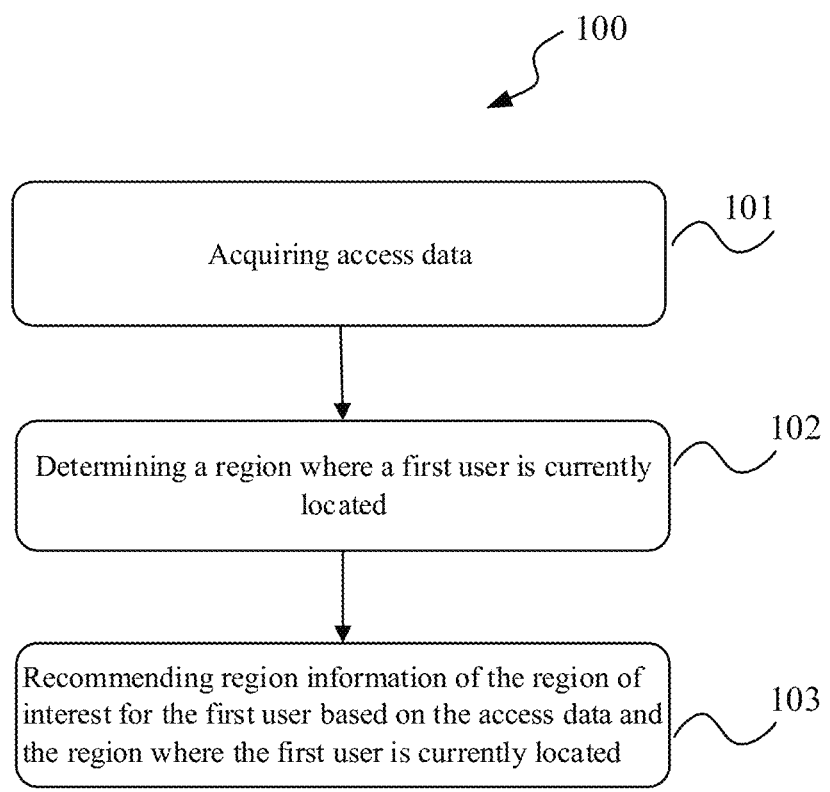
FIG. 1 is a flowchart illustrating a method for recommending a region of interest according to some embodiments of the present disclosure.

The present disclosure will be described in detail below with reference to the accompanying drawings. Although certain embodiments of the present disclosure are illustrated in the drawings, it should be understood that, the present disclosure may be implemented in various forms, and should not be construed as being limited to the embodiments set forth herein. Instead, the embodiments are provided to provide a more complete and clear understanding of the present disclosure. It should be understood that, the drawings and embodiments of the present disclosure are for illustrative purpose only and are not intended to limit the scope of the present disclosure.

It should be understood that, the steps described in the method embodiments of the present disclosure can be performed in different orders and/or in parallel. In addition, method embodiments may include additional steps and/or omit the execution of the illustrated steps. The scope of the present disclosure is not limited in this respect.

Example implementations will now be described more fully with reference to the drawings. However, the example implementations can be implemented in various forms, and should not be construed as being limited to the examples set forth herein. Instead, provision of these implementations makes the present disclosure more comprehensive and complete, and fully conveys the concept of example implementations to those skilled in the art.

Furthermore, described features, structures or characteristics may be combined in one or more embodiments in any suitable manner. In the following description, many specific details are provided to give the sufficient understanding of the embodiments of the present disclosure. However, those skilled in the art should realize that the technical solutions of the present disclosure may be practiced without one or more of the specific details, or other methods, components, apparatuses, steps, etc. may be used. In other cases, well-known methods, apparatuses, implementations, or operations are not shown or described in detail to avoid obscuring aspects of the present disclosure.

Block diagrams illustrated in the drawings are merely functional entities and do not necessarily correspond to physically independent entities. That is, these functional entities may be implemented in the form of software, or implemented in one or more hardware modules or integrated circuits, or implemented in different networks and/or processor apparatuses and/or microcontroller apparatuses.

At present, the research on the relationship between regions is mainly based on expert knowledge and questionnaire collection. Acquiring relationship between regions based on expert knowledge is often affected by subjective factors, which makes it difficult to guarantee the accuracy of the relationship between regions. It often requires a lot of preliminary work to acquire the relationship between regions based on the questionnaire collection. Thus, there are various problems such as low efficiency, high cost, and low accuracy.

FIG. 1 is a flowchart illustrating a method for recommending a region of interest according to some embodiments of the present disclosure. As illustrated in FIG. 1, the method 100 may include the following acts.

At block 101, access data is acquired. The access data includes correlation information between any two regions in a region group, and the correlation between any two regions in the region group is acquired based on a region pair formed by the any two regions in the region group where sample users are located and the number of access times corresponding to the region pair. The region group is acquired based on division of map data, and the map data includes boundary information of an entity in a real world.

At block 102, a region where a first user is currently located is determined.

At block 103, region information of the region of interest is recommended for the first user based on the access data and the region where the first user is currently located.

For example, the region where the first user is currently located may be determined by using at least one of GPS, WIFI, and base station data. Based on the method 100 illustrated in FIG. 1, there is no need to manually collect questionnaires about the relationship between regions on the spot, and the correlation between regions can be calculated, and the region of interest can be conveniently and quickly recommended for the user based on the correlation between regions.

According to some embodiments, access data is acquired, and the access data includes correlation information between any two regions in the region group. The correlation between any two regions in the region group is acquired based on the region pair formed by the any two regions in the region group where sample users are located and the number of access times corresponding to the region pair. The region group is acquired based on division of map data, and the map data includes boundary information of the entity in the real world.

Figure 2:
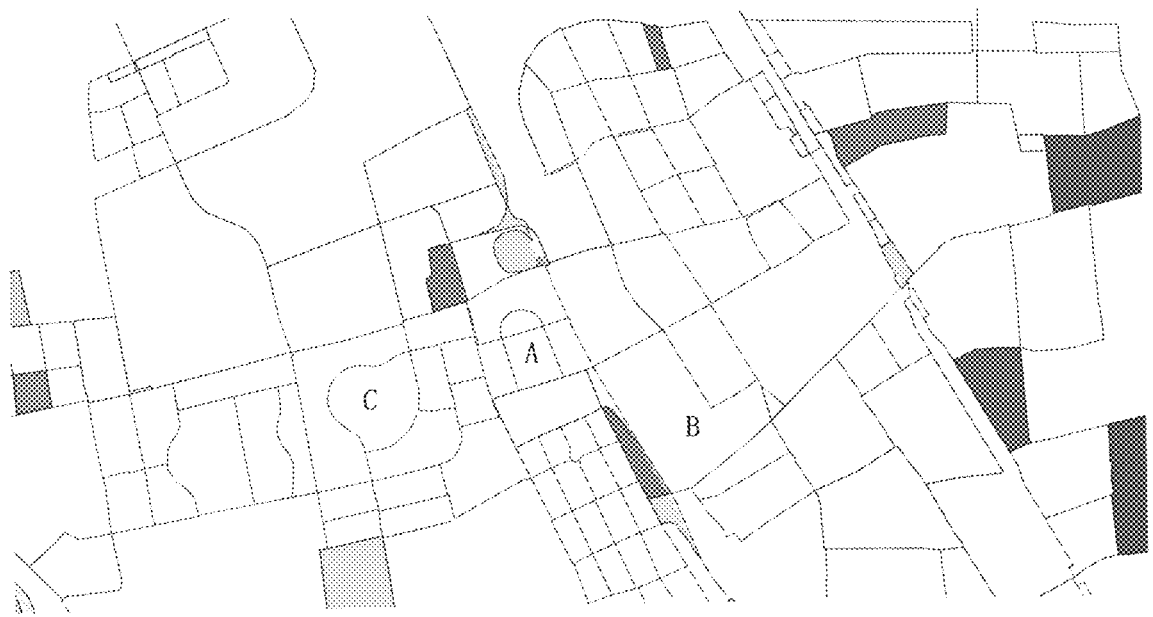
FIG. 2 is a schematic diagram illustrating a region group according to some embodiments of the present disclosure.

The acquisition of the region group will be described below with reference to FIG. 2. FIG. 2 is a schematic diagram illustrating a region group according to some embodiments of the present disclosure.

As illustrated in FIG. 2, regions are divided based on entities in the real world. For example, entities may include roads, POI (Point of Interest) boundaries, AOI (Area of Interest) boundaries, or natural features (rivers), etc. Specifically, according to the map data, A is Baidu Building in the real world, B is Xiaomi Technology Park in the real world, and C is Z-Park in the real world. According to boundary information of the Baidu Building, Xiaomi Technology Park, or Z-Park, the regions corresponding to A, B, and C as illustrated in FIG. 2 can be divided. The region A, region B, and region C are divided based on POI boundaries. This is merely an exemplary description, and regions may also be divided based on boundaries such as roads or natural features, etc. The map data can be divided into multiple regions as illustrated in FIG. 2, and a part of the multiple regions can be taken as a region group according to requirements.

According to some embodiments, the correlation between any two regions in the region group may be acquired by: acquiring, for a first sample user in the sample users, the first resident region and one or more access regions corresponding to the first sample user. By dividing data of the sample users, an effective data source can be acquired. Thereby, the noise of the data source will be reduced, and efficiency can be improved.

According to some embodiments, the method 100 may further include: determining the one or more access regions by acquiring regions accessed by the first sample user in the first time period, and obtaining the first number of access times when the first sample user accesses each of the one or more access regions. The access region with the first number of access times being greater than a preset value is taken as the first resident region. By defining the frequently access region as the resident region, the resident region and the non-resident region of the access regions can be effectively distinguished, such that the stability of the data source can be improved.

According to some embodiments, the method 100 may further include: filtering out the region pair formed by the first resident region and one of the one or more access regions, when the first resident region overlaps with the one of the one or more access regions. When the resident region overlaps with an access region, the region pair formed by the resident region and this access region will lose statistical significance, thus the invalid data is removed to improve the validity of the data.

To facilitate the understanding of the processing of the map data, details will be described below.

To distinguish the resident region and the access region of the sample user, the user's daily access location sequence $(loc_{t_0}, loc_{t_1}, loc_{t_2}, \ldots, loc_{t_t})$ is mapped to the sample user's access region sequence $(r_{t_0}, r_{t_1}, r_{t_2}, \ldots, r_{t_t})$, and the sample user's access region sequence is defined as the sample user's access region. The location sequence information may be acquired based on GPS, WIFI or the base station, and the access region sequence is the region divided according to the map data described above. $t_0, t_1, t_2, \ldots, t_t$ denote the time when the location point is acquired.

In the counting period T, the first number of access times when the sample user accesses the access region is counted, when the first number of access times is greater than the preset value, said access region is taken as the resident region of the first sample user. In some examples, the resident region is a subset of the access region.

In the region group, when the first resident region of the first sample user overlaps with an access region of the first sample user, the resident region overlaps with the access region in this case, and the region pair formed by the resident region and the access region will lose statistical significance. Thus, the region pair formed by the first resident region of the first sample user and the access region of the first sample user is filtered out.

According to some embodiments, the correlation between any two regions in the region group may be acquired by: acquiring, for a first region, the number of region pairs including the first region; calculating the second number of access times between the first region and other regions based on the number of region pairs including the first region; and acquiring the correlation between the first region and other regions based on the second number of access times.

In some examples, for the first sample user u, his/her resident region set $r_u=\{r_1, r_2, \ldots, r_n\}$ and access region set $v_u=\{v_1, v_2, \ldots, v_k\}$ can be acquired, in which, $r_1, r_2, \ldots, r_n$ denote the first resident region, the second resident region, . . . , the nth resident region of the first sample user u, respectively, and $v_1, v_2, \ldots, v_k$ denote the first access region, the second access region, . . . , the kth access region of the first sample user u, respectively.

For the first sample user, the region pair set $w_u=\{(r_1, v_1), (r_1, v_2), \ldots (r_n, v_k)\}$ can be acquired based on the resident region set and the access region set.

For the sample user set U, the region pair relationship set $W=\{w_1, w_2, \ldots, w_n\}$ can be acquired. The sample user set U includes n users, and n is a natural number.

For any two regions $(l_i, l_j)$ in the region set L, the number of access times $S=\{(l_i, l_j, c_{ij})|l_i \in L, l_j \in L\}$ can be counted, where $c_{ij}=|\{w|(l_i, l_j) \in w, w \in W\}|$, $w|(l_i, l_j) \in w, w \in W$, and | denotes any element w in the set W, and the element satisfying $(l_i, l_j) \in w$ form a new set, and || denotes the number of elements in the set.

For the first region $I_i$, the number of region pairs including the first region $I_i$ is acquired. The second number of access times S between the first region and other regions is calculated based on the number of region pairs including the first region, and correlation between the first region and other regions is acquired based on the second number of access times S.

The efficiency of calculating the relationship between regions cam be improved by the above method.

According to some embodiments, the second number of access times is sorted in a reverse order to acquire the correlation ranking between the first region and the other regions.

In some examples, for the region $I_i \in L$, the region with a high correlation can be determined, and then in the set S, the group including $I_i$ is sorted in the reverse order according to $c_{ij}$, and the first few regions can be selected according to actual needs. For example, for Baidu Technology Park, the correlation from high to low may be: Baidu Building, Rongze Jiayuan, Huilongguan Xincun-central district, Yingchuang Dongli, Xinlongcheng phase I, Chunhui Yuan, Xialin Yuan, Dongqing Yuan, Youyi Jiayuan, Qiulu Yuan, Mingke Yuan, Longteng Yuan, Jinyu Huafu, etc.

Accordingly, the region with the high correlation may be the region that the user is interested in.

Referring to FIG. 2, the region A is selected as the first region, and the number of access times that sample users start from the region A to the region B or the region C is counted. For example, the number of times that sample users start from the region A to the region B is 500 (there are 500 region pairs formed by AB), and the number of access times from the region A to the region C is 100 (there are 100 region pairs formed by AC). The number of access times can be sorted in the reverse order, and the region B is ranked first, and the region C is ranked second, and the correlation between the region B and the region A is high. Thus, the efficiency of acquiring the correlation can be improved.

According to some embodiments, the correlation between any two regions in the region group is acquired by: performing vector coding on each region in the region group. Each region in the region group is represented as a node, and the number of access times between regions in the region group is represented as an edge between the corresponding nodes, and the correlation is acquired based on the nodes and edges between nodes. Thus, the recommended region of interest can be quickly acquired.

According to some embodiments, the correlation between regions may be acquired by calculating the distance between the corresponding vectors. Thus, the correlation between regions can be quickly acquired.

In some examples, the correlation between regions may be calculated by Graph Embedding. Specifically, the graph of the map data may be embedded to acquire a low-dimensional dense sequence (vector expression) with high data correlation, so as to facilitate analyzing and processing.

In the process of processing, each region in the graph is represented as the node. Thus, the region group forms a node set L. $c_{ij}$ denotes the edge between node $I_i$ and node $I_j$, the edge in the graph may be expressed by $S=\{(l_i, l_j, c_{ij})|l_i \in L, l_j \in L\}$.

Vector coding may be performed on each region through Graph Embedding, and the correlation between regions can be calculated by calculating the distance between the corresponding vectors. In some examples, Graph Embedding method may include: LINE, GCN, node2vec, etc.

Figure 3:
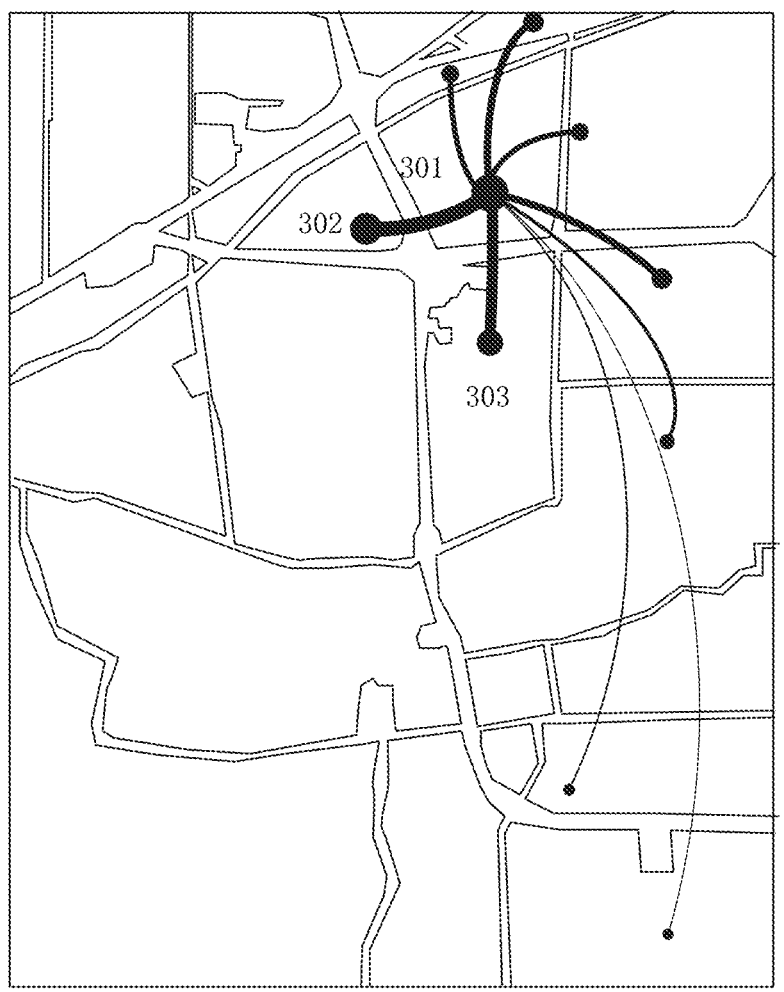
FIG. 3 is a schematic diagram illustrating correlation vector representation between regions according to some embodiments of the present disclosure.

FIG. 3 illustrates the relationships between Xinfadi 301 and the surrounding region 302, the surrounding region 303, etc. The black dot represents the region, and the thickness of the edge between the nodes represents the correlation between the regions. For example, when the edge (such as the edge of Xinfadi 301 and the region 302) is thick, it represents that the correlation between the regions (such as Xinfadi 301 and the region 302) represented by the nodes at two ends of the edge is relatively high. Correspondingly, when the edge (such as the edge of Xinfadi 301 and the region 303) is thin, it represents that the correlation between regions (such as Xinfadi 301 and the region 303) represented by the nodes at two ends of the edge is relatively low. Thereby, the relationship between regions may be more intuitively reflected.

The correlation between regions may be applicable to recommend the region of interest for the user. The correlation between regions may also be applicable to other scenarios. For example, during the epidemic of infectious diseases, based on the correlation between regions, regional management can be better implemented, and transmission risk can be reasonably controlled. Further, for offline advertising such as elevator media, through the correlation between regional relationships, advertising terminal resources can be more rationally arranged, and the effect of advertising can be improved.

Figure 4:
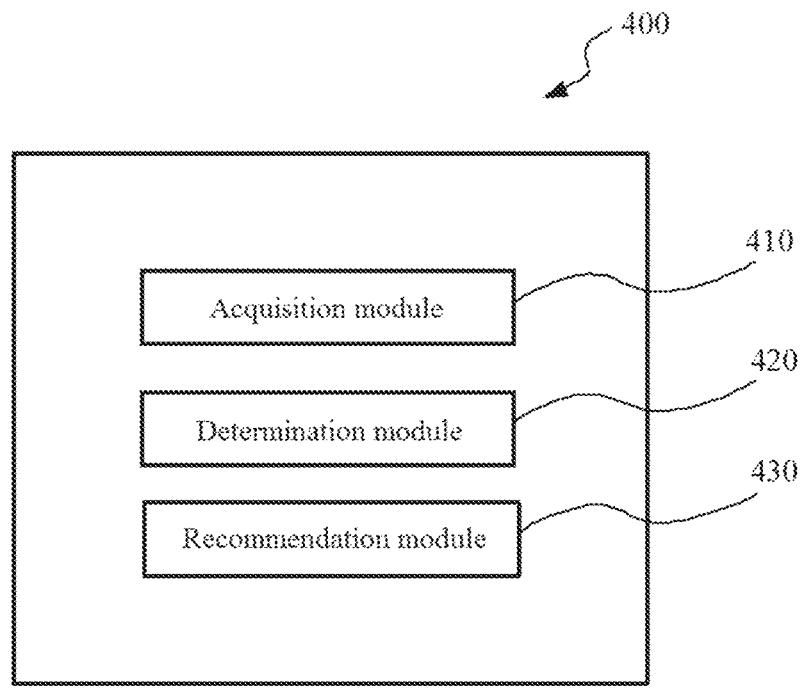
FIG. 4 is a block diagram illustrating an apparatus for recommending a region of interest according to some embodiments of the present disclosure.

FIG. 4 is a block diagram illustrating an apparatus for recommending a region of interest according to some embodiments of the present disclosure. As illustrated in FIG. 4, the apparatus 400 includes an acquisition module 410, a determination module 420, and a recommendation module 430.

The acquisition module 410 is configured to acquire access data. The access data includes correlation information between any two regions in a region group. The correlation between any two regions in the region group is acquired based on a region pair formed by the any two regions in the region group where sample users are located and the number of access times corresponding to the region pair, and the region group is acquired based on division of map data, and the map data includes boundary information of an entity in a real world.

The determination module 420 is configured to determine a region where a first user is currently located.

The recommendation module 430 is configured to recommend region information of the region of interest for the first user based on the access data and the region where the first user is currently located.

Based on the apparatus 400 illustrated in FIG. 4, there is no need to manually collect questionnaires about the relationship between regions on the spot, and the correlation between regions can be calculated, and the region of interest can be conveniently and quickly recommended for the user based on the correlation between regions.

According to some embodiments of the present disclosure, there is further provided a computing device 500 and a readable storage medium.

Figure 5:
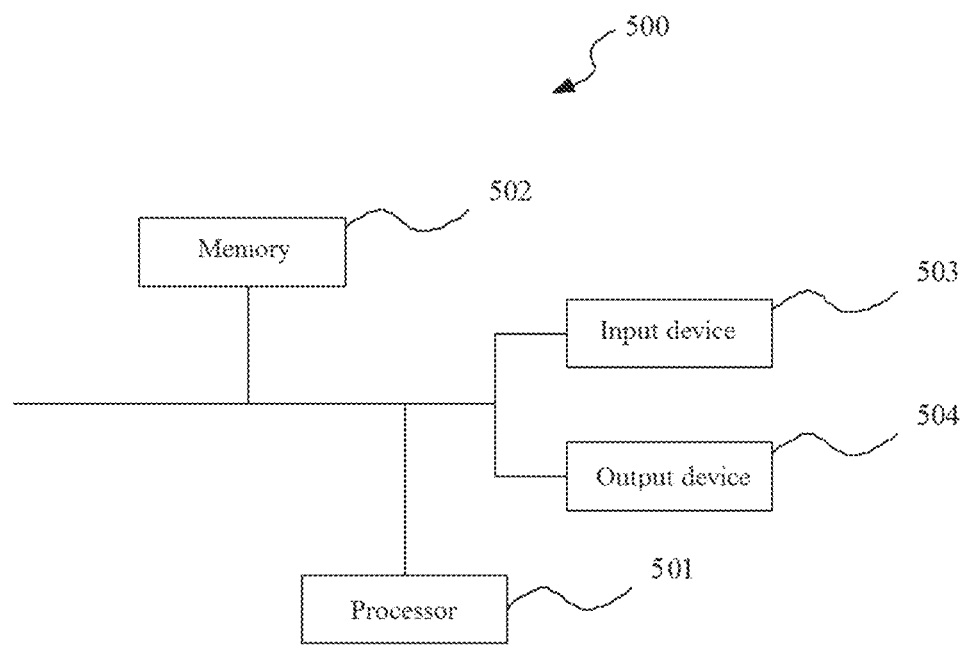
FIG. 5 is a schematic diagram illustrating an exemplary computing device applicable to embodiments of the present disclosure.

FIG. 5 is a schematic diagram illustrating an exemplary computing device applicable to embodiments of the present disclosure.

The computing device is intended to represent various forms of digital computers, such as a laptop computer, a desktop computer, a workstation, a personal digital assistant, a server, a blade server, a mainframe computer, and other suitable computers. The components illustrated herein, their connections and relationships, and their functions are merely examples, and are not intended to limit the implementation of the present disclosure described and/or required herein.

As illustrated in FIG. 5, the computing device 500 includes one or more processors 501, a memory 502, and the interfaces for connecting various components, including high-speed interfaces and low-speed interfaces. The various components are connected by different buses, and can be mounted on a common main board or mounted in other ways as required. The processor may process instructions executed in the computing device (for example, instructions to display graphical information of the GUI on the display device coupled to the interface). In other embodiments, if desired, multiple processors and/or multiple buses and multiple memories may be used together with multiple memories. Similarly, multiple computing devices can be connected, and each device provides corresponding necessary operations (for example, as a server array, a group of blade servers, or a multiprocessor system). In FIG. 5, one processor 501 is illustrated as an example.

The memory 502 is a non-transitory computer-readable storage medium according to the present disclosure. The memory stores instructions that, when executed by at least one processor, cause the at least one processor to execute the method for recommending the region of interest according to the present disclosure. The non-transitory computer-readable storage medium of the present disclosure stores computer instructions for causing the computer to execute the method for recommending the region of interest according to the present disclosure.

As the non-transitory computer-readable storage medium, the memory 502 may be used to store non-transitory software programs, non-transitory computer-executable programs and modules, such as program instructions/modules corresponding to the method for recommending the region of interest according to embodiments of the present disclosure (for example, the acquisition module 410, the determination module 420 and the recommendation module 430 illustrated in FIG. 4). The processor 501 executes various functional applications and data processing in the server by running non-transitory software programs, instructions, and modules stored in the memory 502, that is, implementing the method for recommending the region of interest in foregoing method embodiments.

The memory 502 may include a program storage area and a data storage area. The program storage area may store an application required by the operating system and at least one function, and the data storage region may store data and the like created according to the use of the computing device to implement the method for recommending the region of interest. In addition, the memory 502 may include a high-speed random-access memory, and may also include a non-transitory memory, such as at least one disk memory device, a flash memory device, or other non-transitory solid-state memory devices. In some embodiments, the memory 502 may optionally include memories remotely located with respect to the processor 501, and these remote memories may be connected to the electronic device for implementing the backup management method through a network. Examples of the network include, but are not limited to, the internet, intranet, local area network, mobile communication network and combinations thereof.

The computing device 500 configured to implement the method for recommending the region of interest may further include: an input device 503 and an output device 504. The processor 501, the memory 502, the input device 503, and the output device 504 may be connected by a bus or in other ways. In FIG. 5, the connection by the bus is taken as an example.

The input device 503 may receive input numbers or character information, and generate key signal input related to user settings and function control of the computing device used to implement the method for recommending the region of interest, such as, a touch screen, a keypad, a mouse, a trackpad, a touchpad, a pointing stick, one or more mouse buttons, a trackball, a joystick and other input devices. The output device 504 may include a display device, an auxiliary lighting device (for example, an LED), a tactile feedback device (for example, a vibration motor), and the like. The display device may include, but is not limited to, a liquid crystal display (LCD), a light emitting diode (LED) display, and a plasma display. In some implementations, the display device may be a touch screen.

The various embodiments of the systems and technologies described herein may be implemented in digital electronic circuit systems, integrated circuit systems, ASIC (application specific integrated circuits), computer hardware, firmware, software, and/or combinations thereof. These various embodiments may be implemented in one or more computer programs that can be executed and/or interpreted on a programmable system including at least one programmable processor, the programmable processor may be a dedicated or general programmable processor, which can receive data and instructions from a storage system, at least one input device, and at least one output device, and transmit data and instructions to the storage system, the at least one input device, and the at least one output device.

These computing programs (also called programs, software, software applications, or codes) include machine instructions of the programmable processor, and can be implemented using high-level procedures and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to the programmable processor, including machine-readable media that receive machine instructions as machine-readable signals. The term "machine-readable signal" refers to any signal used to provide machine instructions and/or data to the programmable processor.

To provide interaction with the user, the systems and technologies described herein can be implemented on a computer. The computer may include a display device (e.g., a CRT (cathode ray tube) or LCD (liquid crystal display) monitor) for displaying information to the user, and a keyboard and a pointing device (e.g., a mouse or a trackball) through which the user can provide the input to the computer. Other kinds of devices may also be used to provide interaction with the user. For example, the feedback provided to the user can be sensory feedback in any form (for example, visual feedback, auditory feedback, or tactile feedback), and the input from the user can be received in any form, including acoustic input, voice input or tactile input.

The systems and technologies described herein can be implemented in a computing system including background components (e.g., as a data server), a computing system including middleware components (e.g., an application server), a computing system including front-end components (e.g., a user computer with a graphical user interface or a web browser through which the user can interact with the implementation of the system and technologies described herein), or a computing system including any combination of such background components, middleware components, or front-end components. The components of the system can be interconnected through digital data communication in any form (e.g., a communication network) or medium. Examples of the communication network include a local area network (LAN), a wide area network (WAN), and the Internet.

The computer system may include a client and a server. The client and the server are generally away from each other, and interact through the communication network. The relationship between the client and the server is generated by running computer programs with the client-server relationship on the corresponding computers.

It should be understood that the steps in the flows in various forms shown herein can be reordered, added or deleted. For example, the steps described in the present disclosure can be executed concurrently, sequentially or in a different order, so long as the desired result of the technical solution disclosed in the present disclosure can be achieved, which is not limited herein.

The described example embodiments do not limit the protection scope of the present disclosure. It should be understood by those skilled in the art that various modifications, combinations, sub-combinations and substitutions can be made according to design requirements and other factors. Any modification, equivalent substitution and improvement made within the spirit and principle of the present disclosure shall be included in the protection scope of the present disclosure.

What is claimed is:

1. A method, comprising:
acquiring, by a computing device, access data, the access data comprising correlation information between any two regions in a region group, wherein the correlation information between any two regions in the region group is acquired based on a region pair formed by the any two regions in the region group where sample users are located and the number of access times corresponding to the region pair, wherein the region group is acquired based on division of map data, and the map data comprises boundary information of an entity in a real world, and wherein the correlation information between any two regions in the region group is acquired by acquiring, for a first sample user in the sample users, a first resident region and one or more access regions corresponding to the first sample user;
determining the one or more access regions by acquiring regions accessed by the first sample user in a first time period;
obtaining a first number of access times when the first sample user accesses each of the one or more access regions, wherein the access region with the first number of access times being greater than a preset value is taken as the first resident region;
filtering out a region pair formed by the first resident region and one of the one or more access regions, when the first resident region overlaps with the one of the one or more access regions;
determining, by the computing device, a region where a first user is currently located; and
recommending, by the computing device, region information of the region of interest for the first user based on the access data and the region where the first user is currently located.

2. The method of claim 1, wherein the correlation information between any two regions in the region group is acquired by:
performing vector coding on each region in the region group, wherein each region in the region group is represented as a node, and the number of access times between regions in the region group is represented as an edge between the corresponding nodes, and wherein the correlation information is acquired based on the nodes and edges between nodes.

3. The method of claim 2, wherein the correlation information between any two regions in the region group is acquired by calculating a distance between the corresponding vectors.

4. The method of claim 1, wherein the correlation information between any two regions in the region group is acquired by:
acquiring, for a first region, a number of region pairs including the first region;
calculating a second number of access times between the first region and other regions based on the number of region pairs including the first region; and
acquiring a correlation between the first region and other regions based on the second number of access times.

5. The method of claim 4, wherein the second number of access times is sorted in a reverse order to acquire a correlation ranking between the first region and the other regions.

6. A computing device, comprising:
a processor; and
a memory storing a program, the program comprising instructions that, when executed by the processor, cause the processor to:
acquire access data, the access data comprising correlation information between any two regions in a region group, wherein the correlation information between any two regions in the region group is acquired based on a region pair formed by the any two regions in the region group where sample users are located and the number of access times corresponding to the region pair, wherein the region group is acquired based on division of map data, and the map data comprises boundary information of an entity in a real world, and wherein the correlation information between any two regions in the region group is acquired by acquiring, for a first sample user in the sample users, a first resident region and one or more access regions corresponding to the first sample user;
determine the one or more access regions by acquiring regions accessed by the first sample user in a first time period;
obtain a first number of access times when the first sample user accesses each of the one or more access regions, wherein the access region with the first number of access times being greater than a preset value is taken as the first resident region;
filter out a region pair formed by the first resident region and one of the one or more access regions, when the first resident region overlaps with the one of the one or more access regions;

determine a region where a first user is currently located; and recommend region information of the region of interest for the first user based on the access data and the region where the first user is currently located.

7. The computing device of claim 6, wherein the instructions that, when executed by the processor, further cause the processor to:

Perform vector coding on each region in the region group, wherein each region in the region group is represented as a node, and the number of access times between regions in the region group is represented as an edge between the corresponding nodes, and wherein the correlation information is acquired based on the nodes and edges between nodes.

8. The computing device of claim 7, wherein the correlation information between any two regions in the region group is acquired by calculating a distance between the corresponding vectors.

9. The computing device of claim 6, wherein the instructions that, when executed by the processor, further cause the processor to:

acquire, for a first region, a number of region pairs including the first region;

calculate a second number of access times between the first region and other regions based on the number of region pairs including the first region; and acquire a correlation between the first region and other regions based on the second number of access times.

10. The computing device of claim 9, wherein the second number of access times is sorted in a reverse order to acquire a correlation ranking between the first region and the other regions.

11. A non-transitory computer-readable storage medium storing-computer program instructions that, when executed by a processor, cause the processor to:

acquire access data, the access data comprising correlation information between any two regions in a region group, wherein the correlation information between any two regions in the region group is acquired based on a region pair formed by the any two regions in the region group where sample users are located and the number of access times corresponding to the region pair, wherein the region group is acquired based on division of map data, and the map data comprises boundary information of an entity in a real world, and wherein the correlation information between any two regions in the region group is acquired by acquiring, for a first sample user in the sample users, a first resident region and one or more access regions corresponding to the first sample user;

determine the one or more access regions by acquiring regions accessed by the first sample user in a first time period;

obtain a first number of access times when the first sample user accesses each of the one or more access regions, wherein the access region with the first number of access times being greater than a preset value is taken as the first resident region;

filter out a region pair formed by the first resident region and one of the one or more access regions, when the first resident region overlaps with the one of the one or more access regions;

determine a region where a first user is currently located; and recommend region information of the region of interest for the first user based on the access data and the region where the first user is currently located.

12. The non-transitory computer-readable storage medium of claim 11, wherein computer program instructions that, when executed by the processor, further cause the processor to:

Perform vector coding on each region in the region group, wherein each region in the region group is represented as a node, and the number of access times between regions in the region group is represented as an edge between the corresponding nodes, and wherein the correlation information is acquired based on the nodes and edges between nodes.

* * * * *